(12) United States Patent
Borkowski et al.

(10) Patent No.: US 8,523,058 B2
(45) Date of Patent: *Sep. 3, 2013

(54) TRANSACTION PRODUCT WITH REMOVABLE ARTICLES

(75) Inventors: Erin M. Borkowski, Andover, MN (US); Heidi Schweigert, Golden Valley, MN (US); Timothy P. Clegg, Manhattan Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/830,064

(22) Filed: Jul. 2, 2010

(65) Prior Publication Data

US 2010/0276499 A1    Nov. 4, 2010

Related U.S. Application Data

(63) Continuation of application No. 11/843,844, filed on Aug. 23, 2007, now Pat. No. 7,748,607.

(51) Int. Cl.
*G06K 5/00* (2006.01)
*G06F 17/00* (2006.01)

(52) U.S. Cl.
USPC .......................................... 235/380; 235/375

(58) Field of Classification Search
USPC ............................................... 235/375, 380
See application file for complete search history.

(56) References Cited

U.S. PATENT DOCUMENTS

| 2,412,938 | A | | 12/1946 | Amoth |
| 2,945,586 | A | | 7/1960 | Mackes |
| 3,127,010 | A | | 3/1964 | Capezzuto |
| 4,519,498 | A | * | 5/1985 | Booth ........................... 206/214 |
| 4,526,317 | A | | 7/1985 | Cassidy |
| 4,815,880 | A | | 3/1989 | Sekiguchi |
| 5,038,023 | A | * | 8/1991 | Saliga .......................... 235/385 |
| 5,240,110 | A | | 8/1993 | Reichenbach, III et al. |
| 5,328,026 | A | | 7/1994 | Newman |
| 5,520,309 | A | | 5/1996 | Roth |
| 5,769,213 | A | | 6/1998 | Chatterton |
| 5,813,786 | A | | 9/1998 | Fraenkel |

(Continued)

FOREIGN PATENT DOCUMENTS

GB     2277482 A     11/1994

OTHER PUBLICATIONS

"Circuit City Color-your-own," https://ssl.circuitcity.com/rpsm/oid/174446/type/1/rpem/ccd/imagePopup.do, printed on May 7, 2007, 1 page.

*Primary Examiner* — Michael G Lee
*Assistant Examiner* — David Tardif
(74) *Attorney, Agent, or Firm* — Griffiths & Seaton PLLC; JoAnn M. Seaton

(57) ABSTRACT

A transaction product includes a housing, a tray, one or more articles and an account identifier. The tray is selectively maintained within and readily removable from the housing. The one or more articles are selectively maintained by the tray, and each of the one more articles are readily removable from the tray. The account identifier is associated with the housing and links the transaction product to an account or record having a value configured to be used toward one or more of a purchase and a use of goods or services. Other products, cards, assemblies and associated methods are also disclosed.

17 Claims, 10 Drawing Sheets

(56) References Cited

U.S. PATENT DOCUMENTS

| | | |
|---|---|---|
| 6,571,940 B2 | 6/2003 | Newman |
| 6,808,514 B2 | 10/2004 | Schneider et al. |
| 6,866,439 B2 | 3/2005 | Steinschaden |
| 7,056,121 B2 | 6/2006 | Koeppel |
| 7,163,152 B2 | 1/2007 | Osborn et al. |
| D557,053 S | 12/2007 | Osborn et al. |
| 7,316,357 B2 | 1/2008 | Lindahl et al. |
| 7,342,494 B2 * | 3/2008 | Maloney ............... 340/568.1 |
| D572,588 S | 7/2008 | Osborn et al. |
| 7,591,418 B2 | 9/2009 | Halbur et al. |
| 2002/0088855 A1 * | 7/2002 | Hodes ............... 235/385 |
| 2002/0143697 A1 | 10/2002 | Gotfried |
| 2004/0159701 A1 * | 8/2004 | Abe et al. ............... 235/381 |
| 2006/0124749 A1 | 6/2006 | Osborn et al. |
| 2006/0208062 A1 | 9/2006 | Osborn et al. |
| 2006/0245815 A1 | 11/2006 | Chakmakian |
| 2008/0217401 A1 | 9/2008 | Birkeland et al. |
| 2008/0245875 A1 | 10/2008 | Holt et al. |

\* cited by examiner

TRANSACTION PRODUCT WITH REMOVABLE ARTICLES

CROSS-REFERENCE TO RELATED APPLICATIONS

This application is a continuation of and claims priority under 35 U.S.C. §120 to U.S. patent application Ser. No. 11/843,844, filed Aug. 23, 2007, now U.S. Pat. No. 7,748, 607, issued Jul. 6, 2010, and entitled "Transaction Product with Removable Articles," which is incorporated herein in its entirety.

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY

One aspect of the present invention relates to a transaction product including a housing, a tray, one or more articles and an account identifier. The tray is selectively maintained within and readily removable from the housing. The one or more articles are selectively maintained by the tray, and each of the one more articles are readily removable from the tray. The account identifier is associated with the housing and links the transaction product to an account or record having a value configured to be used toward one or more of a purchase and a use of goods or services. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
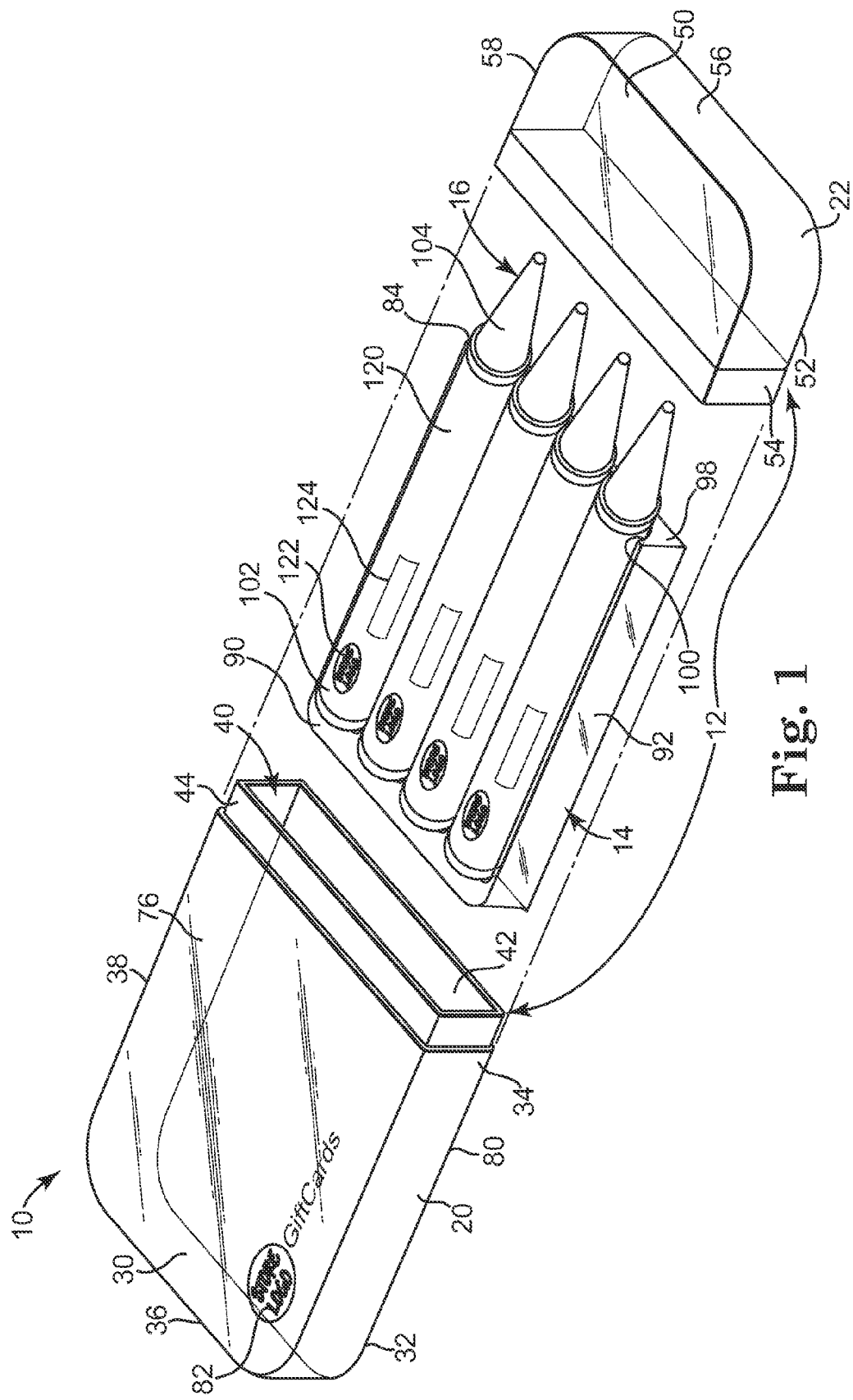
FIG. 1 is an exploded perspective view illustration of a transaction product, according to one embodiment of the present invention.
Figure 2:
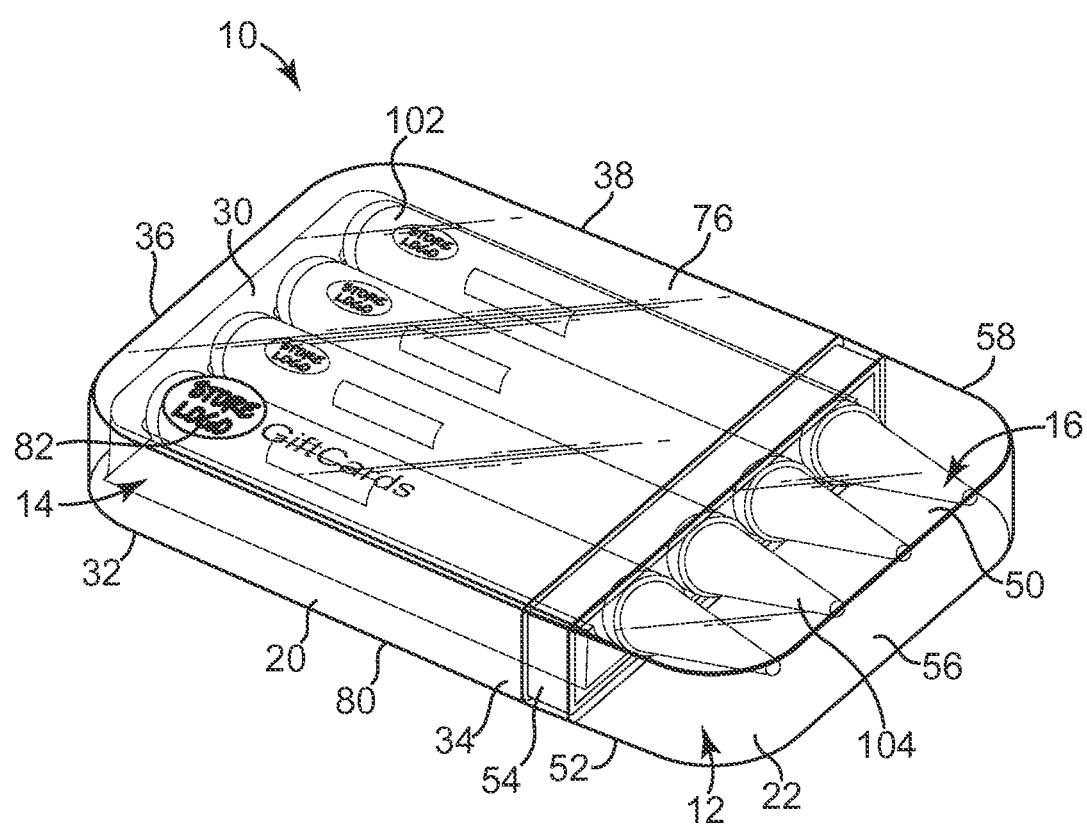
FIG. 2 is a perspective view illustration of a transaction product, according to one embodiment of the present invention.
Figure 3:
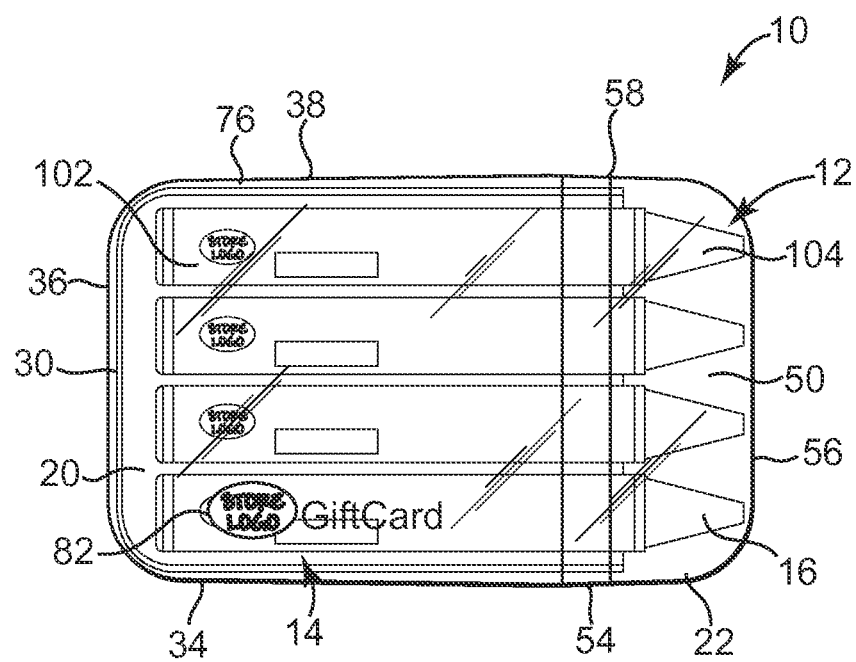
FIG. 3 is a front view illustration of the transaction product of FIG. 2.

A stored-value card and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, provides the consumer and recipient with extra amusement and non-transactional functionality in addition to the ability to pay for goods and/or services with the transaction product.

In particular, the transaction product includes a housing a tray and one or more articles. The tray is configured to selectively fit (e.g., to slidably fit) within the housing and to facilitate organized placement of the article(s) into and/or organized removal of the article(s) from the housing. The housing itself or with tray and/or the article(s) is configured for use toward the purchase or use of one or more of goods and/or services. During non-transactional use, the housing can be opened and the tray and/or the article(s) contained therein can be removed. In one embodiment, the tray is specifically sized and shaped to maintain the other articles in a neat and aesthetically pleasing manner. In one embodiment, removing the tray from the housing also removes the other article(s) from the housing. In one embodiment, the inclusion of tray and/or article(s) and their ability to be readily removed from the transaction product promote the sale and/or loading of the transaction product by potential consumers and/or bearers of the transaction product.

In one embodiment, the one or more articles are a plurality of crayons or other writing utensils. As such, the tray separately maintains each of the crayons, and the tray with the crayons is selectively maintained within the housing. In this manner, the transaction product provides a packaged plurality of crayons that can easily be removed from and stored in the housing. In one example, the housing is formed of two pieces that are selectively coupled to one another. When the tray and crayons are placed within the housing, the two pieces of the housing can be coupled to one another to enclose the tray and crayons within the housing. Conversely, the two pieces of the housing can also be at least partially uncoupled to open the housing allowing the tray and/or the crayons to be readily slid out of or into the housing either before or after the bearer of the transaction product has used the writing utensils to color or otherwise write on a target object.

In one example, the transaction product is coupled with a backer configured to support the transaction product during display. The backer is configured to be written on with the crayons or other writing utensils stored in the housing of the transaction product. In one embodiment, the backer includes black and white characters, object, etc. or other suitable indicia configured to be colored or otherwise decorated using the crayons, etc. In this manner, a transaction product assembly, which includes both the transaction product and the backer, provides a bearer of the transaction product with enclosed, but readily accessible, writing utensils and a target backer to be decorated with the writing utensils in addition to providing the transactional functionality described above.

Turning to the figures, FIGS. 1-7 illustrate a transaction product 10 (e.g., a financial transaction product and/or stored-value card) according to one embodiment of the present invention. Transaction product 10 includes a casing or housing 12, an insert or tray 14 and one or more objects or articles 16. Housing 12 is configured to selectively house tray 14 and/or article(s) 16. In one example, tray 14 is configured to selectively maintain article(s) 16 independently of housing 12.

In one embodiment, housing 12 includes a first housing member 20 and a second housing member 22 configured to be selectively coupled with first housing member 20 to selectively maintain tray 14 and/or article(s) 16 therebetween. First housing member 20 includes a first major panel 30 and a second major panel 32 spaced from and extending substantially parallel with one another. In one embodiment, first and second major panels 30 and 32 are each substantially planar and are similarly sized and shaped. In one example, each of first and second major panels 30 and 32 is substantially rectangular. Side walls 34, 36 and 38 each extend from a different side of and between first and second major panels 30 and 32. More specifically, where first and second major panels 30 and 32 are each substantially rectangular, first side wall 34 extends substantially parallel to third side wall 38, and second side wall 36 extends between first side wall 34 and third side wall 38. In view of this configuration, first housing member 20 defines a chamber 40 therebetween, which is substantially enclosed except for an opening 42 defined opposite second side wall 36 as indicated in FIG. 1.

In one embodiment, a flange 44 (FIG. 1) extends around opening 42 from ends of each of first major panel 30, second major panel 32, first side wall 34 and third side wall 38 positioned opposite second side wall 36 (e.g., adjacent opening 42). More specifically, flange 44 extends substantially parallel to, but inwardly offset from each of first and second major panels 30 and 32 and first and third side walls 34 and 38 away from second side wall 36.

Figure 8:
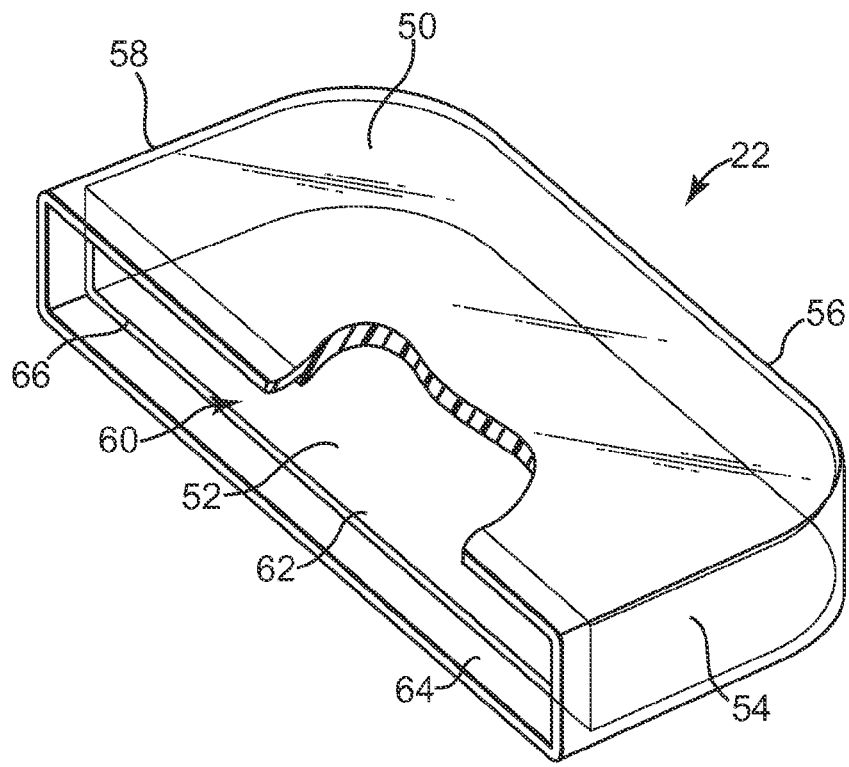
FIG. 8 is a partial perspective view illustration of a first housing member of the transaction product of FIG. 2, according to one embodiment of the present invention.

Additionally referring to FIG. 8, second housing member 22 includes first and second major panels 50 and 52. In one embodiment, first and second major panels 50 and 52 are substantially planar and are spaced from and extend substantially parallel with one another. First and second major panels 50 and 52 are similarly sized and shaped. For instance, in one example, first and second major panels 50 and 52 are each substantially rectangular. Side walls 54, 56 and 58 each extend from a different side of and between first and second major panels 50 and 52. More specifically, first side wall 54 extends substantially parallel to third side wall 58, and second side wall 56 extends between first and third side walls 54 and 58. In view of this configuration, second housing member 22 defines a cavity 60, which is substantially enclosed except for an opening 62 defined opposite second side wall 56.

First and second major panels 50 and 52 and first and third side walls 54 and 58 collectively define an area of reduced thickness 64 of second housing member 22 near and around opening 62. As such, a raised lip 66 is formed inside second housing member 22 at the boundary between area of reduced thickness 64 and the remainder of second housing member 22. In one embodiment, area of reduced thickness 64 extends from opening 62 a distance similar to a distance flange 44 extends from opening 42 of first housing member 20 (FIG. 1). As such, area of reduced thickness 64 is configured to receive flange 44 of first housing member 20 as will be further described below.

In one embodiment, first and second housing members 20 and 22 are each formed by injection molding plastic (e.g. polycarbonate, polystyrene, polyvinyl chloride (PVC), acrylonitrile butadiene styrene (ABS), acrylonitrile styrene, polyethylene terephthalate (PET), teslin, polyactide (PLA) and acrylic) or other suitable material to define the various attributes of first and second housing members 20 and 22. In one embodiment, at least one of first and second housing members 20 and 22 is substantially translucent or substantially transparent. In one example, first and second housing members 20 and 22 are each substantially rigid.

Figure 4:
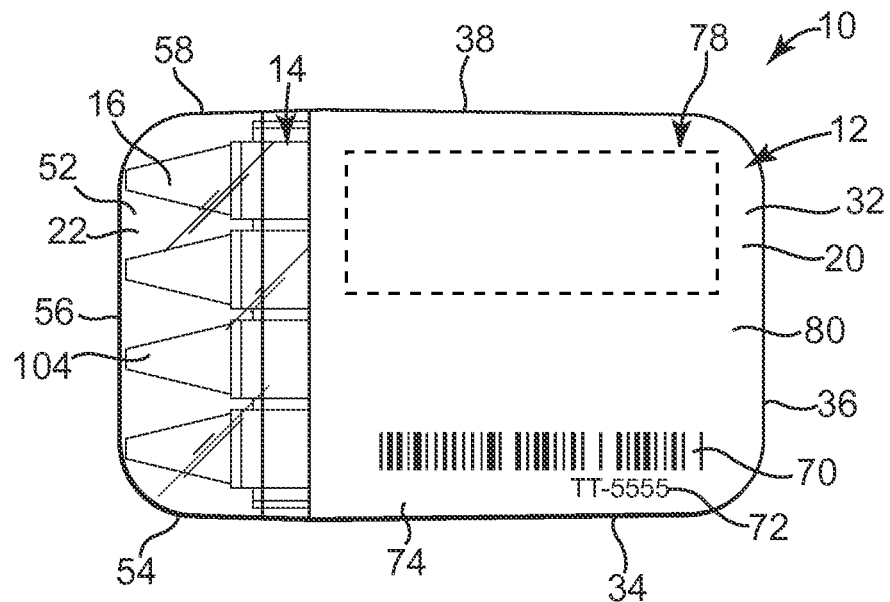
FIG. 4 is a rear view illustration of the transaction product of FIG. 2.
Figure 5:
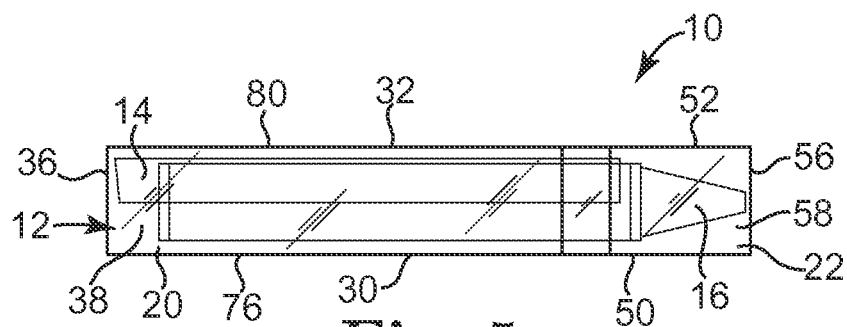
FIG. 5 is a top view illustration of the transaction product of FIG. 2, the bottom view being a mirror image thereof.
Figure 6:
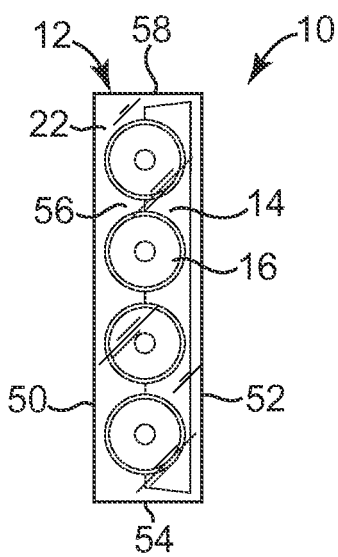
FIG. 6 is a right side view illustration of the transaction product of FIG. 2.
Figure 7:
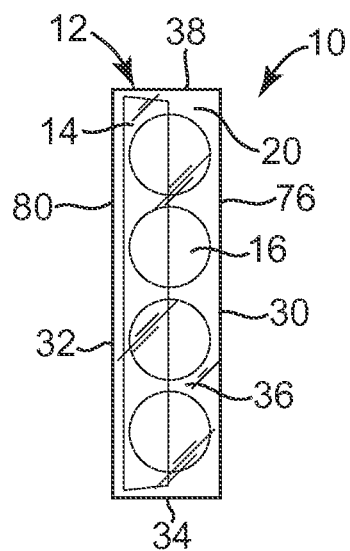
FIG. 7 is a left side view illustration of the transaction product of FIG. 2.

Referring to FIG. 4, an account identifier 70 is included on or otherwise associated with housing 12, for example, on an outside surface 80 of second major panel 32. Account identifier 70 indicates an account or record to which transaction product 10 is linked. The account or record maintains a monetary or other value balance on transaction product 10 and is optionally stored on a database, other electronic or manual record-keeping system or in the case of "smart" cards for example, on a chip or other electronic device on transaction product 10 itself. Accordingly, by scanning or otherwise reading account identifier 70, the account or record linked to transaction product 10 is identified and can subsequently be activated, have amounts debited therefrom and/or have amounts added thereto.

In one embodiment, account identifier 70 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier 70 includes a character string or code 72 (e.g., a number and or letter string) configured to provide additional security to the use of transaction product 10 and/or configured to be read by a bearer of transaction product 10 to facilitate use of transaction product 10 for web site or other purchases outside of a brick-and-mortar type retail establishments. With the above in mind, account identifier 70 is one example of means for linking transaction product 10 with an account or record, and scanning of account identifier 70 is one example of means for activating or loading value on transaction product 10.

In one example, while housing 12 is substantially translucent or substantially transparent, and an opaque field 74 is printed or otherwise applied to outside surface 80 of second major panel 32 of housing 12. In one embodiment, opaque field 74 extends across a substantial entirety of outside surface 80 to substantially block viewing of corresponding chamber 40 (FIG. 1) through outside surface 80. In one embodiment, outside surface 80 is otherwise configured to be opaque. In one embodiment, opaque field 74 is configured to be printed with or to otherwise receive at least a portion of account identifier 70. In the case of a bar code account identifier 70, opaque field 74 facilitates machine scanning of account identifier 70.

In one embodiment, redemption indicia 78, which are generally indicated as a dashed box in FIG. 4. are included on housing 12, such as on opaque field 74. Redemption indicia 78 indicate that transaction product 10 is redeemable toward the purchase or use of goods and/or services, and that, upon use, a value of the purchased or used goods and/or services will be deducted from the account or record linked to transaction product 10. In one embodiment, redemption indicia 78 include phrases such as "<NAME OF STORE >GiftCard" and "This GiftCard is redeemable for merchandise or services at any of our stores or at our website," and/or provides help or telephone information in a case of a lost, stolen or damaged transaction product, etc. In one example, redemption indicia 78 include the following or a similar statement:

This GiftCard is redeemable for merchandise or services at any of our stores or at our web site. This GiftCard is not redeemable for cash or credit except where required by law. No value until purchased. For balance information or to report a lost, stolen or damaged card, call 1-800-555-5555. We can replace the remaining value on a lost stolen or damaged card with the original purchase receipt. No fees. No expiration. No kidding.

In one embodiment, other indicia are printed or otherwise disposed on one or more of outside surface 76 of first major panel 30 and or an outside surface 80 of second major panel 32. Other indicia may be included on first housing member 20 and second housing member 22 such as other objects, text, backgrounds, graphics, brand identifiers, etc. In one example, additional indicia 82 include decorative and/or informative items, such as objects relating to the nature of the transaction product 10 and or to brand, store, product or other related items (e.g., a logo, trademark or mascot). Other suitable combinations or selections of indicia 82 to be displayed on housing 12 are also contemplated.

Referring once again to FIG. 1, tray 14 is formed with external dimensions allowing tray 14 to be readily slid into and out of housing 12, for example, at least partially into and out of one or both of chamber 40 and cavity 60 (FIG. 8). In one embodiment, where housing 12 is substantially rectangular, tray 14 is substantially rectangular. It should be noted that while tray 14 is shown for illustrative purposes as being spaced slightly away from side walls 34, 36 and 38, in one embodiment, upon sliding tray 14 into chamber 40, tray 14 interacts with sidewalls 34, 36 and 38 to snugly position tray 14 within chamber 40. Tray 14 is configured to receive each of article(s) 16 in a generally neat and aesthetically pleasing manner to organize placement of article(s) 16 within chamber 40 and/or cavity 60. In one embodiment, tray 14 is independently configured to support the one or more articles 16 whether or not tray 14 is positioned within or outside of housing 12. In view of at least the above, tray 14 is one example of means for selectively receiving article(s) 16.

Figure 9:
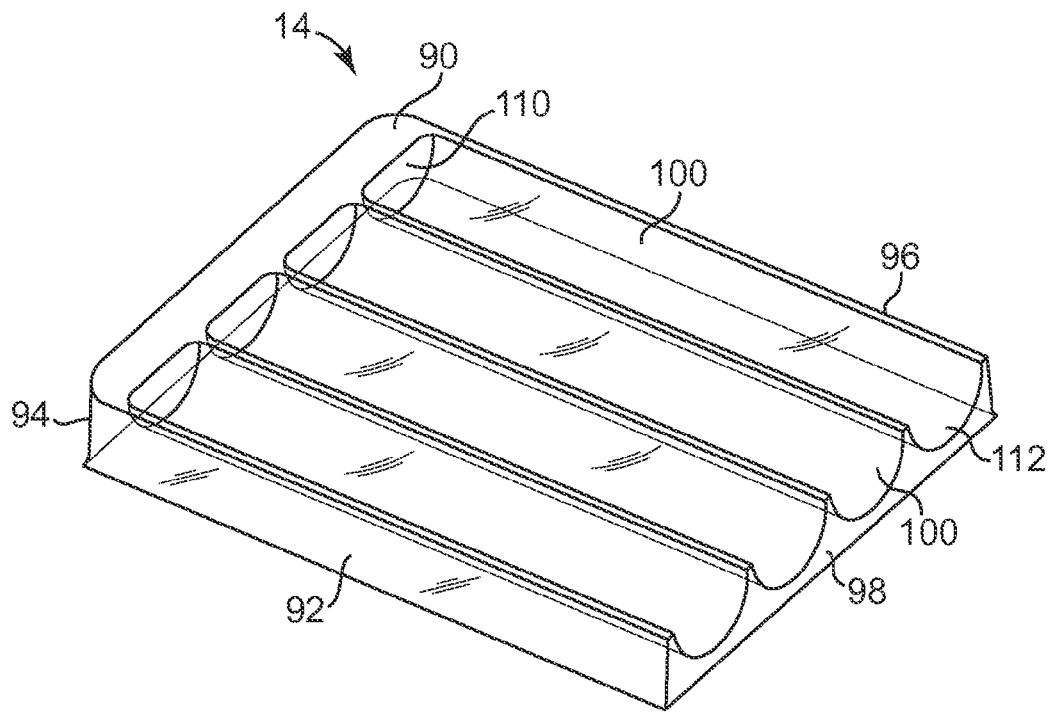
FIG. 9 is a perspective view illustration of a tray of the transaction product of FIG. 2, according to one embodiment of the present invention.

For example, additionally referring to the embodiment of FIG. 9, tray 14 defines a primary surface 90 and side walls 92, 94, 96 and 98 extending from a perimeter of primary surface 90 in a direction substantially perpendicular and/or a direction angled outwardly therefrom. For example, first side wall 92 and third side wall 96 are positioned opposite one another, and second side wall 94 and fourth side wall 98 are positioned to each extend between first side wall 92 and third side wall 96 opposite one another. In one embodiment, each side wall 92, 94, 96 and 98 is curved slightly outwardly at edges opposite main planar surface to add to the rigidity of tray 14.

In one embodiment, one or more recesses or indentations 100 are defined by tray 14, wherein each indentation 100 is sized with a cross-sectional shape specifically configured to receive one of article(s) 16. For example, in one embodiment, where the one or more articles 16 are a number of writing utensils (e.g., crayons, markers, pencils and/or pens) each indention 100 has a lateral cross-section sized and shaped to mimic at least a portion of the lateral cross-sectional shape of each writing utensil, albeit slightly larger, such that each article 16 fits snugly at least partially within a corresponding indentation 100 (see, e.g., FIGS. 1, 6 and 7). For example, the cross-sectional shape of each indentation 100 may mimic less than all of (e.g., substantially half of) the cross-sectional shape of the corresponding article 16, such that each article fits or nests partially within the corresponding indentation and extends from indentation 100 beyond primary surface 90, which allows the bearer of transaction product 10 to more easily grasp and remove each article 16 from tray 14.

In one embodiment, tray 14 is formed by injection molding plastic (e.g. polycarbonate, polystyrene, polyvinyl chloride (PVC), acrylonitrile butadiene styrene (ABS), acrylonitrile styrene, polyethylene terephthalate (PET), teslin, polyactide (PLA) and acrylic) or other suitable material to define the various attributes of tray 14. In one embodiment, tray 14 is substantially translucent or substantially transparent an/or otherwise coordinates with first housing member 20 and second housing member 22. In one example, tray 24 is substantially rigid.

In one embodiment, the one or more articles 16 are each elongated and define a first end 102 and a second end 104 opposite first end 102. In one embodiment, where each article 16 is a crayon or other writing utensil, first end 102 is substantially flat while second end 104 is substantially pointed. In one example, indentations 100, which each correspond to one of elongated article(s) 16, are also elongated and are laterally spaced from one another on tray 14. Each indentation 100 may be independently formed or defined to extend from primary surface 90, while, in one embodiment, each indentation may extend to and/or be partially defined by one or more of side walls 92, 94, 96 and 98.

For example, in one embodiment, indentation 100 is elongated and defines a first end 110 and a second end 112 opposite first end 110. First end 110 is defined to extend from primary surface 90 near to, but not to intersect second side wall 94. Second end 112, however, extends through fourth side wall 98. In one example, indentation 100 has a shorter longitudinal dimension than the corresponding article 16 such that each article 16 placed in indentation 100 such that first end 102 of article 16 is adjacent first end 110 of indentation, second end 104 of article 16 extends from indentation 100 outwardly beyond fourth side wall 98 as illustrated in FIG. 1. The extension of second end 104 of article beyond fourth side wall 98 of tray 14 serves to provide second end 112 away from tray 14, which allows article(s) 16 to be easily grasped and removed from tray 14. Although specific arrangements of indentations 100 are described herein for illustrative purposes, other arrangements of indentations 100 will be apparent to those of skill in the art upon reading the present application.

Although pictured and primarily described as being a writing utensil, use of other suitable article(s) 16 is also contemplated as will be apparent to those of skill in the art. However, in one embodiment, each article 16 is a crayon formed of a wax and pigment material. In addition, other features of article(s) 16 are also contemplated. For example, article(s) 16 may each include a wrapper or other covering 120 and/or may include brand indicia 122, which identify a brand of a store, department or product for sale and/or other decorative or advertising indicia 124 as generally indicated in FIG. 1. In one example, where housing 12 or at least a portion thereof is transparent or translucent, article(s) 16 and therefore, covering 120, brand indicia 122 and/or indicia 124, if any, are viewable through at least one surface of housing 12 even when transaction product 10 is assembled. The external viewing of article(s) 16 promotes sale of transaction product 10 by clearly showing a user what article(s) 16 are included with transaction product 10.

During assembly, tray 14 receives article(s) 16. In one example, one of article(s) 16 is placed within each indentation 100 of tray 14, such that each article 16 is snuggly retained in place at least partially within tray 14. Once article(s) 16 are placed in tray 14, tray 14 is placed within one of first housing member 20 and second housing member 22. More specifically, in one example, tray 14 is slid into first housing member 20 such that second wall 94 of tray 14 is positioned nearest to second wall 36 of first housing member 20. Subsequently, second housing member 22 is coupled with first housing member 20, thereby enclosing tray 14 and article(s) 16 therebetween, more particularly, within chamber 40 and/or cavity 60 (FIG. 8).

More specifically, in one embodiment, first housing member 20 is slid toward and together with second housing member 22 such that flange 44 of first housing member 20 is received by the area of reduced thickness 64 of second housing member 22. In this manner, first and second housing members 20 and 22 are coupled to one another with a friction fit such that chamber 40 and cavity 60 are placed in communication with (i.e., are open to) one another. First and second housing members 20 and 22 are one example of means for enclosing tray 14 and the one or more articles 16, are respectively examples of means for defining chamber 40 and means for defining cavity 60. Other methods of coupling first and second housing members 20 and 22 or enclosing tray 14 and article(s) 16 are also contemplated.

Upon assembly, second side wall 36 of first housing member 20 and second side wall 56 of second housing member 22 each independently define an opposite, external end wall of housing 12. First and second housing members 20 and 22 collectively define opposite external side walls of housing 12 each extending between side walls 36 and 56. In one embodiment, the resulting housing 12 is substantially rectangular and sized similarly to an identification card, a credit card or other card sized to fit in a wallet of a user; however, housing 12 may be slightly thicker to accommodate receipt of tray 14 and the one or more articles 16. In one embodiment, housing 12 is shaped as a square, circle, oval, star or another suitable shape.

During use of transaction product 10 for entertainment purposes, first and second housing members 20 and 22 are separated and tray 14 and the one or more articles 16 are removed from within first and second housing members 20 and 22. As described above, in one embodiment, upon removal of tray 14 from housing 12, each article 16 is separately and selectively stored and removable from tray 14 for use, for example, within a corresponding indentation 100. In one example, given that each indentation 100 is open to fourth side wall 98, each article 16 can be slid into and/or out of the corresponding indentation 100 through opening 42 of first housing member 20 without first removing tray 14 from housing 12. In one embodiment, where article(s) 16 are writing utensils, article(s) 16 are selectively maintained within housing 12 before, after and/or during use.

Figure 10:
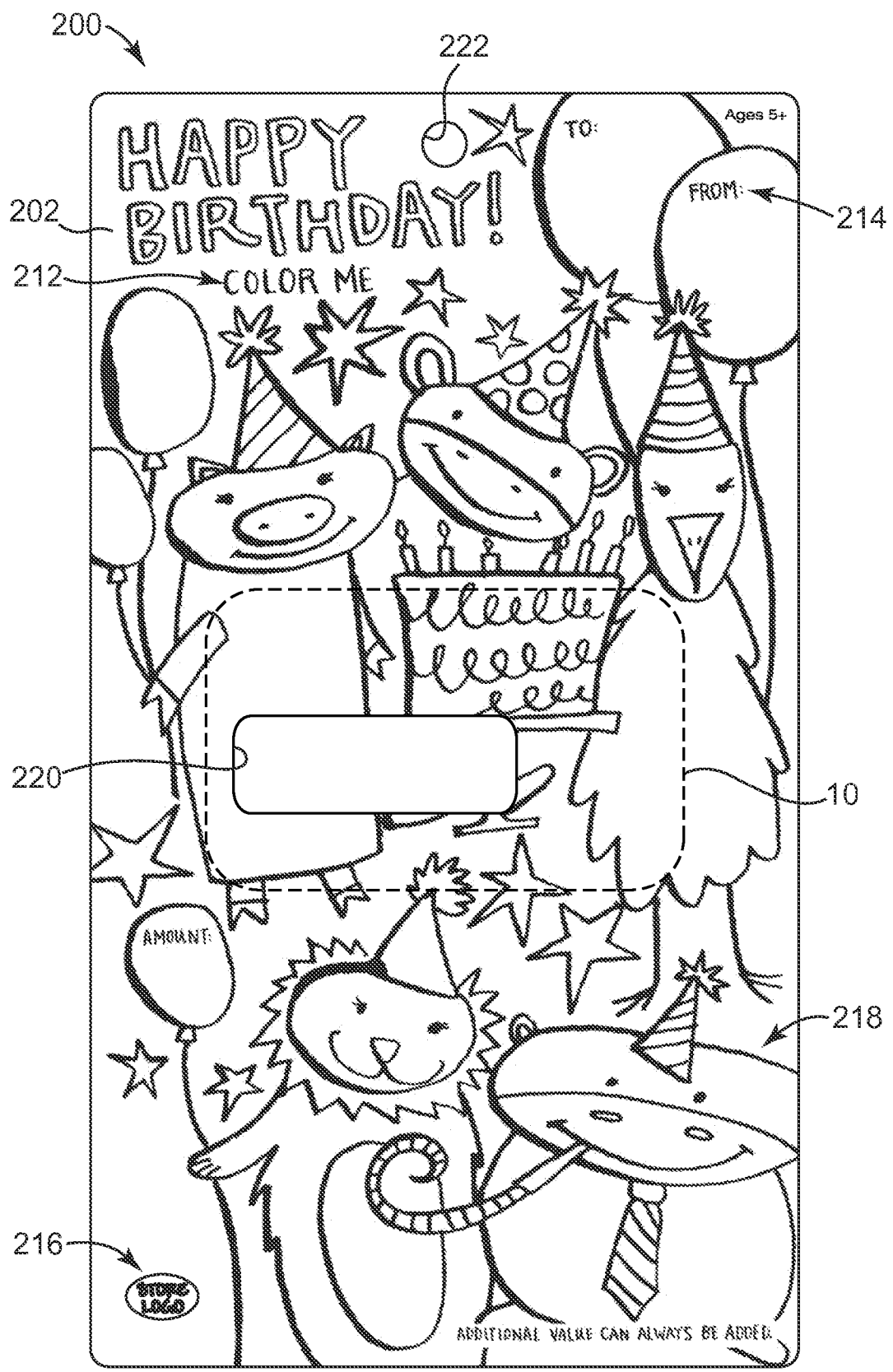
FIG. 10 is a front view illustration of a backer, according to one embodiment of the present invention.
Figure 11:
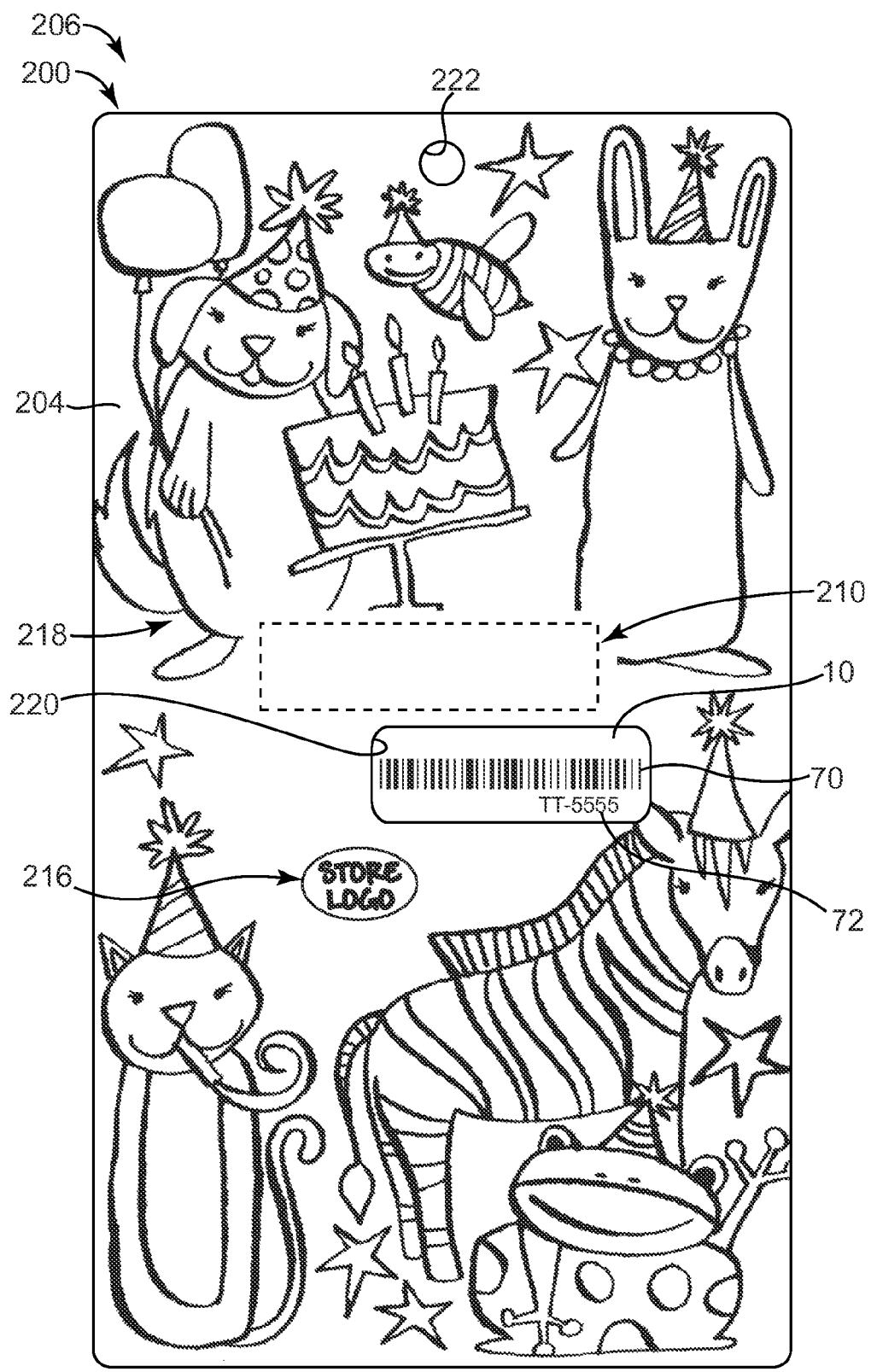
FIG. 11 is a rear view illustration of the backer of FIG. 10 supporting the transaction product of FIG. 1, according to one embodiment of the present invention.

FIGS. 10 and 11 illustrate a carrier or backer 200 supporting transaction product 10 (FIGS. 1-7). Backer 200 comprises a single layer or multiple layers of paper or plastic material, for example, generally in the form of a relatively stiff but bendable/flexible card. Use of other materials to form backer 200 is also contemplated. Backer 200 defines a first or front surface 202 (FIG. 10) and a second or rear surface 204 (FIG. 11). In one embodiment, as will be further described below, backer 200 is formed of a material and/or coated with a material such that at least one of front surface 202 and rear surface 204 of backer 200 is configured to receive writings (e.g., coloring or other demarcations) from writing utensils, which in one embodiment are provided as articles 16 (e.g., FIG. 1), as will be further described below.

Transaction product 10, which is generally represented in broken lines in FIG. 10 for illustrative purposes (e.g., to allow for full viewing of front surface 202), is readily releasably attached to backer 200, for example, by adhesive, blister packaging, overlying skinning material or the like, such that transaction product 10 and backer 200 collectively define a transaction product assembly 206.

In one embodiment, backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 202 and 204. In one example, the indicia include one or more of redemption indicia 210, instructional indicia 212, message field indicia 214, brand indicia 216, decorative indicia 218, etc.

Redemption indicia 210, which are generally indicated as a dashed box in FIG. 11, indicate that transaction product 10 is redeemable for the purchase of goods and/or services and that upon use, a value of the purchased goods and/or services will be deducted from the account or record linked to transaction product 10. In one embodiment, redemption indicia 210 include phrases such as "<NAME OF STORE>GiftCard" and "This GiftCard is redeemable for merchandise or services at any of our stores or at our website," and/or provides help or phone line information in case of a lost, stolen or damaged transaction product 10, etc. In one example, redemption indicia 210 include the following or a similar statement:

This GiftCard is redeemable for merchandise or services at any of our stores or at our web site. This GiftCard is not redeemable for cash or credit except where required by law. No value until purchased. For balance information or to report a lost, stolen or damaged card, call 1-800-555-5555. We can replace the remaining value on a lost stolen or damaged card with the original purchase receipt. No fees. No expiration. No kidding.

Instructional indicia 212 include any indications generally referring to how transaction product 10 can be used for entertainment or functional purposes other than value redemption. For example, indicia 212 may instruct the bearer to "Color Me" where one or both of front surface 202 and rear surface 204 are configured to be written or colored upon (as illustrated in FIGS. 10 and 11) with article(s) 16, for example, where article(s) 16 are crayons or other writing utensils. Other instructional indicia 212 are also contemplated.

Message field indicia 214 for example include "to," "from" and "amount" fields are configured to be written to by the bearer of transaction product assembly 206 prior to presenting transaction product assembly 206 to a recipient. As such, message field indicia 214 facilitate the consumer in preparing transaction product assembly 206 for gifting to a recipient. Brand indicia 216 identify a store, brand, department, etc. and/or services associated with transaction product 10.

Any decorative indicia 218 may also be included on backer 200. In one embodiment, where article(s) 16 (e.g., FIG. 1) are writing utensils such as crayons, markers, pencils, pens, etc., decorative indicia 218 may be configured to receive writing by such writing utensils. In one example, at least a portion of decorative indicia 218 are black and white or other suitable characters, objects, etc. configured to be colored or otherwise decorated with writing utensils. Any of indicia 210, 212, 214, 216, 218 or other indicia optionally may appear anywhere on backer 200 or transaction product 10. Additional information besides that specifically described and illustrated herein may also be included.

In one embodiment, backer 200 defines a window or opening 220 for displaying account identifier 70 of transaction product 10 as illustrated in FIG. 11. As previously described, account identifier 70 is adapted for accessing an account or record associated with transaction product 10 for activating, loading or debiting value from the account or record. Accordingly, in one embodiment, opening 220 allows access to account identifier 70 to activate and/or load transaction product 10 without removing transaction product 10 from backer 200.

In one embodiment, backer 200 defines a hanging aperture 222 configured to receive a support arm or hook, such that transaction product assembly 206 can be hung from a rail or rack within the retail setting or elsewhere to facilitate display of transaction product assembly 206. According to one embodiment, FIG. 11 illustrates surfaces of backer 200 that will be supported on a rack or other fixture while FIG. 10 illustrates surfaces of backer 200 that will be visible to a consumer of a retail store who is considering the purchase of transaction product assembly 206. Other backers, such as foldable backers (not shown), can be used with various sizes and shapes of transaction products 10.

Figure 12:
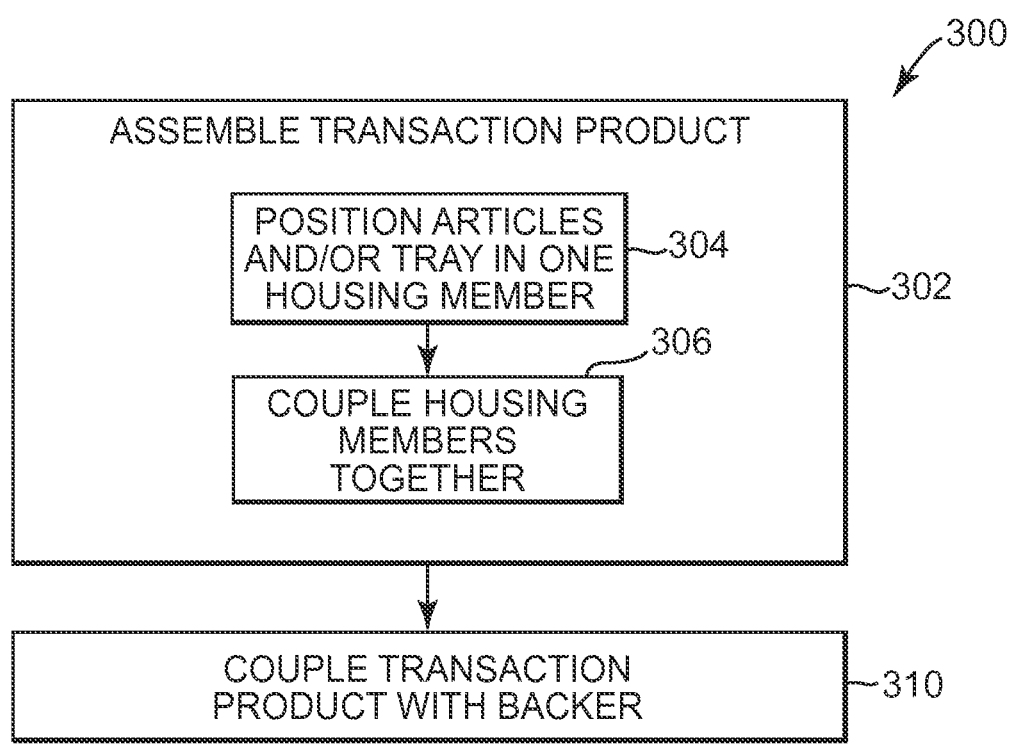
FIG. 12 is a flow chart illustrating a method of assembling a transaction product, according to one embodiment of the present invention.

FIG. 12 is a flow chart illustrating one embodiment of a method 300 of assembling transaction product assembly 206. Additionally referring to FIG. 1, at 302, transaction product 10 is assembled. More specifically, at 304, tray 14 and the one or more articles 16 are positioned within one of chamber 40 of first housing member 20 and cavity 60 of second housing member 22. Subsequently, at 306, first and second housing members 20 and 22 are slid and coupled together. More specifically, flange 44 of first housing member 20 is received by area of reduced thickness 64 of second housing member 22. As such, housing members 20 and 22 are coupled together via a friction fit such that tray 14 and the one or more articles 16 are enclosed therebetween within chamber 40 and cavity 60 (FIG. 8).

At 310, the assembled transaction product 10 is coupled with backer 200 to form a transaction product assembly 206 as illustrated with additional reference to FIG. 11. In one example, transaction product 10 is coupled to backer 200 with an adhesive, overlying skinning material or other selectively releasable material or device such that account identifier 70 is viewable through opening 220 of backer 200 as illustrated in FIG. 11.

Figure 13:
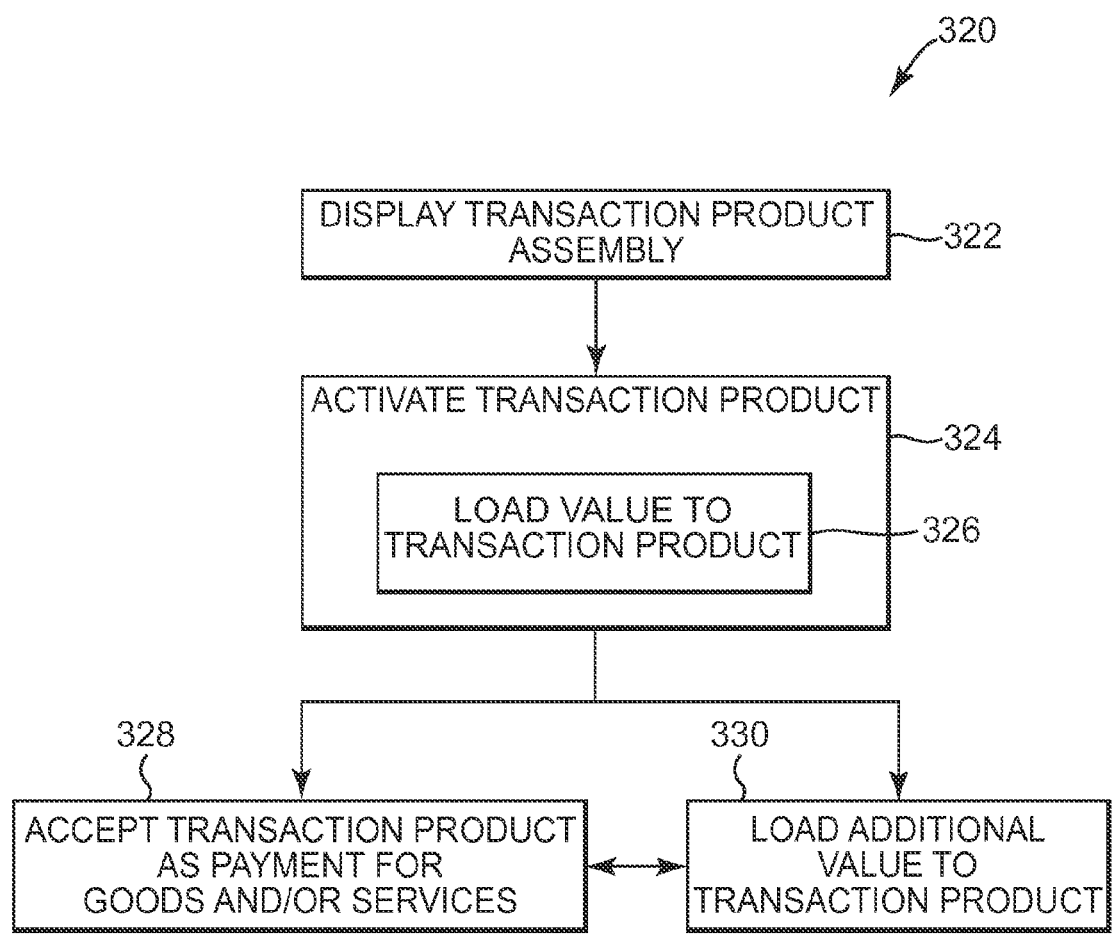
FIG. 13 is a flow chart illustrating a method of providing a transaction product, according to one embodiment of the present invention.

FIG. 13 is a flow chart illustrating one embodiment of a method 320 of providing transaction product assembly 206 for sale to and for use by consumers. At 322, transaction product assembly 206 is placed or hung from a rack, shelf or similar device to display transaction product assembly 206 for sale to potential consumers. In one example, transaction product assembly 206 is placed for sale such that transaction product 10 is visible to potential consumers. In one embodiment, a depiction of transaction product 10 and/or transaction product assembly 206 is placed on a website for viewing and purchase by potential consumers. In one embodiment, transaction product 10 is displayed without backer 200.

At 324, a consumer, who has decided to purchase transaction product 10, presents transaction product assembly 206 or at least transaction product 10 to a retail store employee, retail store kiosk or other person or device to scan account identifier 70 of transaction product 10 (e.g., through opening 220 in backer 200) to access the account or record linked to account identifier 70. Upon accessing the account or record, the account or record is accessed and value is added thereto. Thus, transaction product 10 is activated and loaded. Once transaction product 10 is activated and loaded, transaction product 10 can be used by the consumer or any other bearer of transaction product 10 to purchase goods and/or services at the retail store or other affiliated retail setting or website.

In one example, a predetermined value is associated with transaction product 10 (i.e., associated with the account or record linked to transaction product 10 via account identifier 70) prior to activation and display, but such predetermined value is not initially available for use toward the purchase or use of goods and/or services. In such an embodiment, at 324, transaction product 10 is activated to permit subsequent access to the predetermined value (e.g., subsequent loading on and debiting from the account or record) and no additional value is added during activation such that operation 326 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, or other goods/services. In one embodiment, where transaction product 10 is displayed on a web site at 322, then, at 324, transaction product 10 may be activated in any suitable method and may not require machine scanning of account identifier 70 to be activated or to otherwise access the associated account or record such as at 326.

At 328, the retail store or other affiliated retail setting or website accepts transaction product 10 as payment toward the purchase of goods and/or services made by the current bearer of transaction product 10. In particular, the value currently loaded on transaction product 10 is applied towards the purchase of goods and/or services. At 330, additional value is optionally loaded on transaction product 10 at a point-of-sale terminal, kiosk or other area of the retail store or related setting. Upon accepting transaction product 10 as payment at 328, the retail store or related setting can subsequently perform either operation 328 again or operation 330 as requested by a current bearer of transaction product 10. Similarly, upon loading additional value to transaction product 10 at 330, the retail store or related setting can subsequently perform either operation 330 again or operation 328. In one example, the ability to accept transaction product 10 as payment for goods and/or services is limited by whether the financial account or record associated with transaction product 10 has any value at the time of attempted redemption.

Figure 14:
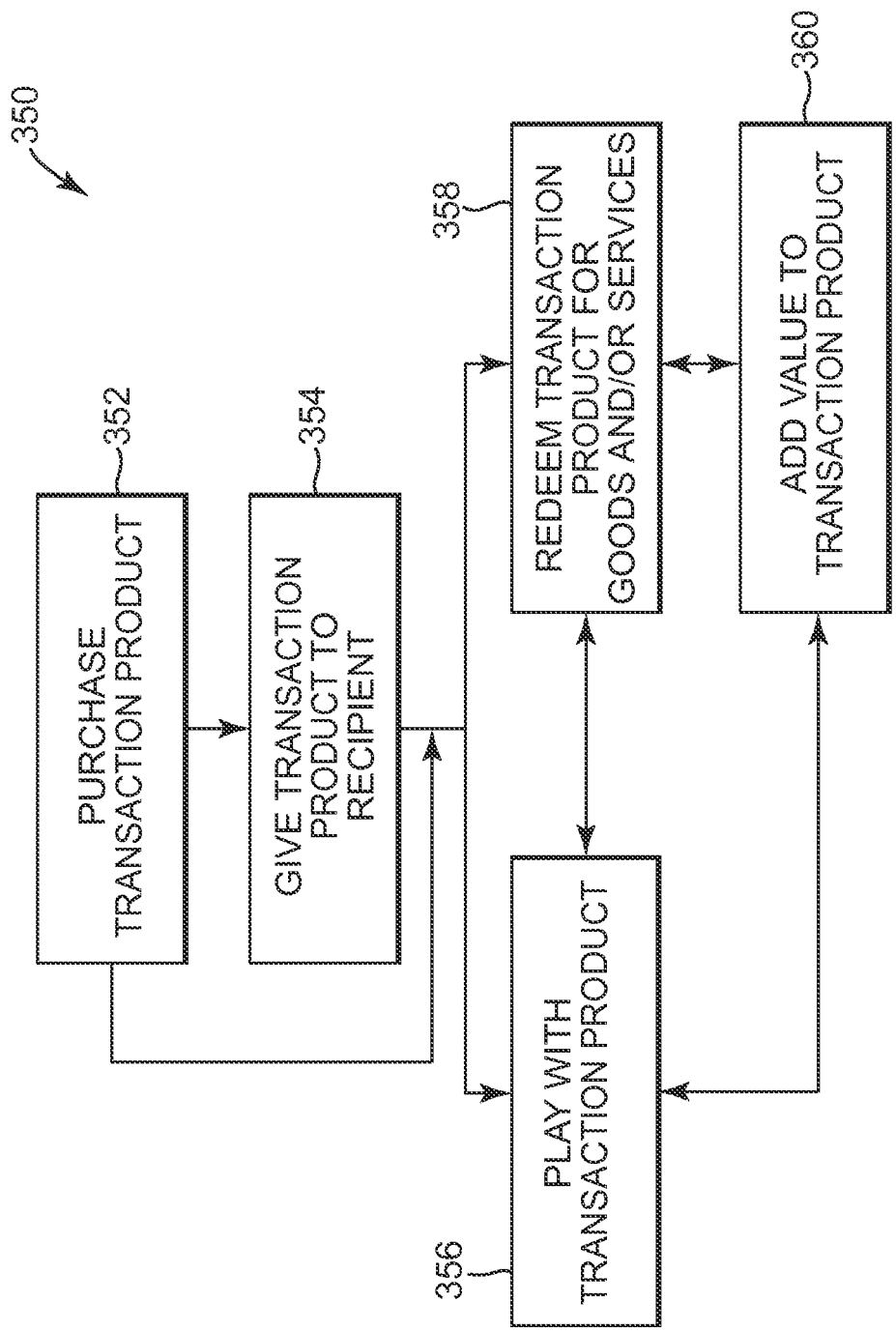
FIG. 14 is a flow chart illustrating a method of using a transaction product, according to one embodiment of the present invention.

FIG. 14 is a flow chart illustrating one embodiment of a method 350 of using transaction product 10. At 352, a potential consumer of transaction product 10, which is displayed in a retail store or viewed on a website, decides to and does purchase transaction product 10 from the retail store or website setting. Transaction product 10 can be displayed and purchased alone or as part of transaction product assembly 206. Upon purchasing of transaction product 10, a retail store employee, retail store kiosk or other person/machine scans account identifier 70 and to thereby activate or load value onto transaction product 10.

At 354, the consumer optionally gives transaction product 10 to a recipient, such as a graduate, relative, friend, expectant parents, one having a recent or impending birthday, a couple having a recent or impending anniversary, etc. As an alternative, the consumer can keep transaction product 10 for his or her own use and operation 354 can be eliminated.

At 356, the consumer or recipient, whoever is in current ownership or otherwise is the current bearer of transaction product 10, plays with transaction product 10 or otherwise uses transaction product 10 in a non-transactional capacity. More specifically, the bearer removes transaction product 10 from backer 200, if transaction product 10 is coupled with backer 200. The bearer opens housing 12 by separating first housing member 20 from second housing member 22 to access article(s) 16 stored therein. As such, article(s) 16 may be selectively removed from housing 12 one at a time or simultaneously via tray 14. Once article(s) 16 are removed from housing 12, the bearer of transaction product 10 can write with, play with or otherwise use article(s) 16 in any suitable manner for the pleasure of the bearer. As such, the bearer of transaction product 10 and other observers are entertained.

At 358, the current bearer of transaction product 10 redeems transaction product 10 for goods and/or services from the retail store or website. For example, before or following play at 356 and replacement of tray 14 and article(s) 16 back in housing 12, transaction product 10 as a whole is redeemed toward the purchase or use of goods and/or services at 358. In one embodiment, following removal of tray 14 and/or article(s) 16 at 356, housing 12 alone without tray 14 and/or article(s) 16 is redeemed toward the purchase or use of goods and/or services. Any other portion of transaction product 10 alone can be redeemed toward the purchase or use of goods and/or services provided that portion of transaction product 10 includes account identifier 70.

At 360, the current bearer of transaction product 10 optionally adds value to transaction product 10, and more particularly, to the account or record associated with transaction product 10, at the retail store or over the Internet. Upon playing with transaction product 10 at 356, redeeming transaction product 10 at 358 or adding value to transaction product 10 at 360, the current bearer of transaction product 10 subsequently can perform any of operations 356, 358 or 360 as desired. In one embodiment, the ability of the current bearer to repeat redeeming transaction product 10 at 358 is limited by whether the financial account or record associated with transaction product 10 has any value at the time of attempted redemption. In one embodiment, only tray 14 and the one or more articles 16 and, in one example, backer 200, are used to play with transaction product 10 at 356 and/or only housing 12 is used to redeem transaction product 10 at 358. As such, in one example, operations 356 and 358 can be simultaneously preformed.

Although described above as occurring at single retail store or website, in one embodiment, purchasing transaction product 10 at 352, redeeming transaction product 10 at 358 and adding value to transaction product 10 at 360, can each be performed at any one of a number of stores adapted to accept transaction product 10 or over the Internet. In one example, the number of stores are each a part of a chain or similarly branded stores. In one example, the number of stores includes at least one website and/or at least one conventional brick and mortar store.

Transaction products come in many forms, according to embodiments of the invention. The gift card, like other transaction products, can be "recharged" or "reloaded" at the direction of the original consumer, the gift recipient or third party. The term "loading on" or "loaded on" herein should be interpreted to include adding the balance of a financial account or record associated with the corresponding transaction product. The balance associated with a transaction product declines as the card is used, encouraging repeat visits. The transaction product remains in the purse or wallet of the user, serving as an advertisement or reminder to revisit the associated merchant. Transaction products, according to embodiments of the invention, provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product comprising:
   a housing defining a substantially planar panel and an internal chamber, the substantially planar panel defining an interior surface and an exterior surface opposite the interior surface, wherein the interior surface is directly adjacent the internal chamber;
   a tray selectively enclosed within and readily removable from and replaceable within the internal chamber of the housing, the tray defining two or more indentations;
   a plurality of articles each selectively maintained within a corresponding one of the two or more indentations of the tray, wherein each of the plurality of articles is readily removable from the tray; and
   an account identifier fixedly coupled to the exterior surface of the substantially planar panel and linking the housing to an account or record having a monetary value configured to be used toward a price of one or more of a purchase and a use of goods or services;
   wherein each of the two or more indentations defines a cross-sectional shape similar to at least a portion of a cross-sectional shape of a corresponding one of the plurality of articles, and the cross-sectional shape of the corresponding one of the plurality of articles is defined in a direction substantially transverse to an elongated axis of the corresponding one of the plurality of articles.

2. The transaction product of claim 1, wherein the account identifier includes a bar code.

3. The transaction product of claim 1, wherein the account identifier is at least partially machine readable and includes one or more of a bar code, a magnetic strip, a smart chip or a radio frequency identification (RFID) device.

4. The transaction product of claim 1, in combination with a database remote from the transaction product, the database storing the account or record.

5. The transaction product of claim 1, wherein each of the two or more indentations is elongated to receive a substantial length of the corresponding one of the plurality of articles as measured in a direction parallel to the elongated axis of the corresponding one of the plurality of articles.

6. The transaction product of claim 5, wherein:
   the tray defines a first side,
   each of the two or more indentations are open to the first side,
   the housing comprises a first housing member and a second housing member configured to be selectively coupled with one another to selectively close the housing and configured to be selectively and entirely separated from one another to selectively open the housing, and the plurality of articles and the tray are entirely enclosed within the housing when the housing is closed.

7. The transaction product of claim 6, wherein:

when the plurality of articles and the tray are enclosed within the housing, the housing prevents each of the plurality of articles from being removed via the first side of the tray, and when the tray is removed from the housing, the plurality of articles are readily removable from the first side of the tray.

8. The transaction product of claim 1, wherein:

the housing comprises a first housing member and a second housing member configured to be selectively coupled with one another to selectively close the housing and configured to be selectively and entirely separated from one another to selectively open the housing, and the plurality of articles and the tray are entirely enclosed within the housing when the housing is closed.

9. The transaction product of claim 8, wherein:

the first housing member defines the internal chamber and an opening to the internal chamber, the second housing member defines a cavity, when the first housing member and the second housing member are coupled to one another, the internal chamber and the cavity are positioned in direct communication with one another, the tray is substantially maintained within the internal chamber when the tray is enclosed within the housing, and when the first housing member and the second housing member are coupled to one another such that the tray is enclosed within the housing, the two or more indentations of the tray are open toward the cavity such that, when the first housing member and the second housing member are uncoupled from one another, each of the plurality of articles can be slid out of the internal chamber and the corresponding one of the two or more indentations while the tray remains substantially maintained within the internal chamber.

10. The transaction product of claim 9, wherein each of the plurality of articles is at least partially maintained within each of the internal chamber and the cavity when the housing when the first housing member and the second housing member are coupled to one another such that the tray is enclosed within the housing.

11. The transaction product of claim 1, in combination with a single panel backer selectively coupled with the housing and configured to support the transaction product.

12. The transaction product of claim 1, wherein:

the housing consists of a first housing member and a second housing member selectively coupled with one another to entirely enclose the tray within the housing, and each of the first housing member and the second housing member is formed as a single piece of a substantially rigid material.

13. A transaction product comprising:

an enclosure including:

a first member, which defines a compartment with an opening to the compartment, and a second member removably coupled with the first member to selectively cover the opening, wherein the first member and the second member are configured to be repeatedly coupled with and uncoupled from one another;

an insert formed separately from, selectively maintained within, and readily removable from the enclosure, the insert defining:

a primary, substantially planar surface, side walls each extending from the primary, substantially planar surface with an orientation substantially perpendicular to the primary, substantially planar surface, and a plurality of recesses each open to the primary, substantially planar surface and a first one of the side walls;

one or more objects selectively maintained by the insert within the plurality of recesses, wherein:

each of the one or more objects extends from a corresponding one of the plurality of recesses beyond the first one of the side walls of the insert, and at least half of a cross-sectional shape of each of the one or more objects extends from the corresponding one of the plurality of recesses beyond the primary, substantially planar surface of the insert such that, when the insert is removed from the enclosure, each of the one or more objects is readily removable from the corresponding one of the plurality of recesses from both the primary, substantially planar surface and the first one of the side walls; and an account identifier associated with and securely affixed to the enclosure, wherein the account identifier links the transaction product to an account or record having a monetary value configured to be used toward one or more of a purchase and a use of goods or services.

14. The transaction product of claim 13, wherein the first one of the side walls is the only one of the side walls defining a portion of each of the plurality of recesses such that each of the one or more objects only extends beyond the first one of the side walls.

15. The transaction product of claim 13, wherein:

the first member substantially prevents the one or more objects from being removed from the plurality of recesses via the primary, substantially planar surface when the insert and the one or more objects are selectively maintained within the enclosure, and the second member substantially prevents the one or more objects from being removed from the plurality of recesses via the first one of the side walls when the insert and the one or more objects are selectively maintained within the enclosure.

16. The transaction product of claim 13, wherein:

the side walls each define a free edge opposite the primary, substantially planar surface, and the plurality of recesses are defined such that the plurality of objects are entirely maintained on a common side of the free edges defined by the side walls as the primary, substantially planar surface.

17. The transaction product of claim 13, wherein:

the first member includes a substantially planar panel extending substantially parallel with the primary, substantially planar surface of the insert, the substantially planar panel defines an inside surface in direct contact with the compartment and an outside surface opposite the inside surface, and the account identifier is securely affixed to the outside surface of the substantially planar panel.

* * * * *